Patented Oct. 31, 1944

2,361,452

UNITED STATES PATENT OFFICE 2,361,452

ISOMERIZATION PROCESS

Cecil L. Brown, Baton Rouge, La., assignor to Standard Oil Development Company, a corporation of Delaware No Drawing. Application December 24, 1940, Serial No. 371,597

9 Claims. (Cl. 260—683.5)

The present invention relates to an improved method for isomerizing paraffin hydrocarbons and more specifically to a method for improving the yields in reactions in which a catalyst is employed.

It is known that normal paraffin hydrocarbons can be isomerized by means of Friedel-Crafts catalysts, such as aluminum chloride or bromide, zinc chloride, ferric chloride and the like. It is likewise known that the catalyst in almost every case requires an activator, since without such activator its activity diminishes very rapidly. As activators, hydrogen halides, such as hydrogen chloride, and alkyl halides have been employed. The activators are employed in quantities which are small relative to the amount of catalyst which is present.

It has been found that surprisingly large yields of paraffin isomers may be obtained in catalytic isomerization processes when a sufficiently large quantity of an alkyl halide is present to act as a mutual solvent for the catalyst and the normal hydrocarbon which is to be converted. The quantity of alkyl halide which is required is very much greater than that which is necessary to act merely as a promoter for the catalyst, and is preferably used in quantities ranging from 50% to 150% by weight of the hydrocarbon feed. The improvement in yield by the method of this invention is so great that considerably lower isomerization temperatures may be employed than was possible heretofore if substantial yields were to be realized. Temperatures upwards of 200° F. have been required to give good yields, for example, in the case of the isomerization of normal butane, but with such temperatures there is a substantial loss in the formation of hydrocarbons of both lower and higher molecular weight. By using a large proportion of an alkyl halide, such as ethyl chloride, in this reaction, temperatures as low as 150° F. may be advantageously employed, and there results a considerable increase in selectivity in favor of the production of isobutane.

The present invention has application in converting pure normal paraffin hydrocarbons, especially those containing eight carbon atoms or less per molecule, such as butane, pentane, hexane, heptane, octane, and their homologues, into their corresponding branched iso forms, such as isobutane and the like; or the feed stock may comprise mixtures of more than one of these straight chain paraffins, such as gasolines or naphthas. The invention includes also the conversion of branched chain paraffins into isomeric, more highly branched hydrocarbons. In general, any hydrocarbon mixture composed predominantly of paraffin hydrocarbons is suitable for use as a feed stock for the process herein outlined.

The alkyl halides which may be used as mutual solvents for the Friedel-Crafts type catalyst and the hydrocarbon feed may be any alkyl halides which are liquid under the conditions of operation, and are preferably those having boiling points at least as high as that of the hydrocarbon being converted. Halides which are especially preferred as solvents are the primary alkyl halides, such as ethyl chloride, propyl chloride, butyl chlorides and methyl bromide.

The conditions for isomerizing with the present catalysts and mutual solvents are much the same as those formerly employed with the hydrogen halide activators. A wide temperature range may be employed, for example, from about −50° F. to about 250° F., and the isomerization should be conducted in the liquid phase to realize the advantages of the present invention. In the case of the isomerization of normal butane, it is preferable to employ temperatures not higher than about 150° F. in order to avoid cracking and polymerization.

The time of the reaction varies with other features, such as temperature, the amount of catalyst, the particular catalyst used and the particular feed stock treated. In general, however, the time of reaction may be from ½ to 30 hours, and the conditions are usually adjusted so as to obtain a conversion of 25% to 50%.

The amount of catalyst to be used varies widely, depending upon the particular hydrocarbon which is to be converted, the amounts ranging from 2% to 150% by weight of hydrocarbon material present in the reactor. For the conversion of normal butane in the presence of aluminum chloride it is advantageous to use from about 10% to about 50%, preferably about 15%, by weight of aluminum chloride.

As stated above, the reaction is carried out under liquid phase conditions. Hence, any temperature below the critical temperature of the feed stock may be employed, although it is preferable to use the temperatures specified above. Sufficient superatmospheric pressure may be employed to maintain the reactants as well as the reaction products in the liquid phase under the reaction conditions obtained. The temperature and pressure conditions should, however, be such as are substantially unfavorable to cracking of the hydrocarbons present. Where a batch type of reaction is employed, it is well to employ turbo mixers or some similar dispersion means for increasing intimacy of contact between the catalyst and the feed.

The process of the present invention may be conducted as a continuous operation. In such a case the hydrocarbon feed is continuously passed into a reaction vessel and the products of the reaction are passed out in vapor phase and separated by fractionation. The unconverted hydrocarbon and any of the alkyl halide solvent which has escaped from the reaction zone as a vapor are returned to the reactor. Any decomposition products of the alkyl halide, such as hydrogen halide and olefin, may be likewise returned to the reaction zone where they will be combined to form alkyl halide and assist in maintaining equilibrium conditions, and, if desired, additional quantities of hydrogen halide or olefin or both may be introduced into the system to maintain the desired concentration of alkyl halide.

The advantages of the present invention are illustrated by the following data:

EXAMPLE 1

In the following series of tests under comparable conditions a portion of liquid normal butane was agitated in a closed reaction vessel in the presence of 15% by weight of aluminum chloride. The results when conducting the tests at various temperatures and in the presence of various amounts of activators or mutual solvents are shown in the following table. The results indicate the percentage yield of isobutane, the yield of hydrocarbon lighter and heavier than butane, the total conversion of normal butane and the selectivity as to the formation of isobutane in preference to other products. The percentages of catalyst, activator, etc. are based upon the weight of the hydrocarbon feed.

*Isomerization of normal butane*

| No. | Catalyst | Activator or solvent | Temp., °F. | Time, hrs. | Yields, per cent | | | Per cent conversion | Isobutane selectivity, per cent |
|---|---|---|---|---|---|---|---|---|---|
| | | | | | Isobutane | Lighter hydrocarbons | Heavier hydrocarbons | | |
| 1 | 15% AlCl$_3$ | 2% C$_2$H$_5$Cl | 225 | 4 | 54 | 6 | 6 | 66 | 82 |
| 2 | 15% AlCl$_3$ | 5% HCl | 150 | 2 | 5 | 0 | 0 | 5 | 100 |
| 3 | 15% AlCl$_3$ | 5% C$_2$H$_5$Cl | 150 | 2 | 1 | 0 | 0 | 1 | 100 |
| 4 | 15% AlCl$_3$ | 100% C$_2$H$_5$Cl | 150 | 2 | 32.5 | 0 | 0.5 | 34 | 98 |

It can be seen from the above data that the yields of isobutane are very much greater when a large quantity of ethyl chloride is present than when only a small amount is used merely for promotional effect or when a small amount of hydrogen chloride is used at the same reaction temperature. The data also show that, although fairly high yields may be obtained by the use of only 2% of ethyl chloride as promoter when the reaction temperature is 225° F. and the heating is continued for four hours, there is considerably lower selectivity and considerable permanent loss of hydrocarbons results from the formation of products of lower and higher molecular weight.

The present invention is not to be limited by any theory of the reaction mechanism or by any of the examples which are given by way of illustration, but only by the following claims in which it is desired to claim all novelty inherent in the invention.

I claim:

1. A continuous process of isomerizing paraffin hydrocarbons containing at least 4 carbon atoms per molecule which comprises continuously passing the said hydrocarbons into a liquid phase reaction mixture containing a Friedel-Crafts type catalyst and a concentration of an alkyl halide which is at least 50% by weight of the hydrocarbon present, maintaining temperature and pressure conditions within said reaction zone which are favorable to isomerization in liquid phase but substantially unfavorable to cracking of said hydrocarbons, passing the product of isomerization continuously from said reaction zone in vapor phase, separating the said product of isomerization from any alkyl halide and decomposition products of the same, and returning the said alkyl halide and decomposition products to the reaction zone.

2. In a process for the conversion of paraffin hydrocarbons containing at least 4 carbon atoms per molecule by reacting the same in liquid phase in the presence of a Friedel-Crafts type catalyst under conditions which favor the isomerization of such hydrocarbons but are substantially unfavorable to the cracking of said hydrocarbons, the step which comprises conducting the reaction in the presence of a quantity of an alkyl halide which is equal to at least 50% by weight of the hydrocarbon present.

3. A process according to claim 2 in which the paraffin hydrocarbons contain not more than 8 carbon atoms per molecule.

4. A process according to claim 2 in which the alkyl halide is a primary alkyl halide.

5. A process according to claim 2 in which the catalyst is aluminum chloride and in which the quantity of alkyl halide is equal to about 50% to about 150% by weight of the hydrocarbon present.

6. A process according to claim 2 in which the alkyl halide is ethyl chloride.

7. A process according to claim 2 in which the catalyst is aluminum chloride and in which the alkyl halide is ethyl chloride, the same being present in an amount equal to about 50% to about 150% by wieght of the hydrocarbon present.

8. In a process for the conversion of normal butane by reacting the same in liquid phase in the presence of about 15% by weight of aluminum chloride ûnder conditions which favor the isomerization of said butane but are substantially unfavorable to the cracking of the same, the step which comprises conducting the reaction in the presence of about 100% by weight of ethyl chloride, based on the hydrocarbon present.

9. A process according to claim 8 in which the reaction is conducted at a temperature of about 150° F.

CECIL L. BROWN.